United States Patent [19]

Constable

[11] Patent Number: 5,390,020
[45] Date of Patent: Feb. 14, 1995

[54] VIDEO AMPLIFIER STABILIZATION FOR CRT PRINTING

[75] Inventor: Douglas W. Constable, Rochester, N.Y.

[73] Assignee: Eastman Kodak Company, Rochester, N.Y.

[21] Appl. No.: 945,317

[22] Filed: Sep. 14, 1992

[51] Int. Cl.[6] .............................................. H04N 5/84
[52] U.S. Cl. ..................................... 358/350; 348/805
[58] Field of Search ............... 358/184, 171, 174, 172, 358/302, 76, 79, 479, 485, 244, 244.1, 244.2, 345, 350, 351, 352, 691; 355/20; H04N 5/18, 5/84; 348/805

[56] References Cited

U.S. PATENT DOCUMENTS

| | | | |
|---|---|---|---|
| 3,207,998 | 9/1965 | Corney et al. | 330/11 |
| 3,543,169 | 11/1970 | Hill | 328/151 |
| 3,582,545 | 6/1971 | Thorpe | 178/7.2 |
| 3,651,248 | 3/1972 | Schneider | 178/5.4 R |
| 3,723,647 | 3/1973 | John, Jr. | 358/244.1 |
| 3,777,056 | 12/1973 | Pieters | 178/7.1 |
| 3,970,777 | 7/1976 | Bradford et al. | 178/7.1 |
| 3,987,242 | 10/1976 | Gold | 358/171 |
| 4,012,775 | 3/1977 | Smith | 358/171 |
| 4,143,398 | 3/1979 | Harwood et al. | 358/34 |
| 4,197,557 | 4/1980 | Tuma et al. | 358/34 |
| 4,203,131 | 5/1980 | Harwood et al. | 358/34 |
| 4,218,706 | 8/1980 | Briegar et al. | 358/172 |
| 4,257,065 | 3/1981 | Papay | 358/172 |
| 4,369,466 | 1/1983 | Matsuzaki et al. | 358/170 |
| 4,403,254 | 9/1983 | Okada et al. | 358/171 |
| 4,437,117 | 3/1984 | Haendle | 358/244 |
| 4,473,839 | 9/1984 | Noda | 358/41 |
| 4,513,321 | 4/1985 | Olson et al. | 358/172 |
| 4,549,214 | 10/1985 | Hinn | 358/172 |
| 4,612,576 | 9/1986 | Hinn | 358/171 |
| 4,660,084 | 4/1987 | Filliman et al. | 358/171 |
| 4,660,085 | 4/1987 | Harwood et al. | 358/171 |
| 4,679,087 | 7/1987 | Torrano, Jr. et al. | 358/168 |
| 4,680,624 | 7/1987 | Murakami | 358/44 |
| 4,682,211 | 7/1987 | Kaji | 358/41 |
| 4,689,679 | 8/1987 | Hinn | 358/168 |
| 4,689,680 | 8/1987 | Bahrle et al. | 358/172 |
| 4,706,131 | 11/1987 | Perten et al. | 358/171 |
| 4,710,725 | 12/1987 | White et al. | 330/51 |
| 4,742,292 | 5/1988 | Hoffman | 323/314 |
| 4,786,970 | 11/1988 | Moore | 358/184 |
| 4,797,744 | 1/1989 | Klemmer et al. | 358/164 |
| 4,811,087 | 3/1989 | Engel et al. | 358/36 |
| 4,811,101 | 3/1989 | Yagi | 358/171 |
| 4,914,324 | 4/1990 | Goto | 307/546 |
| 5,303,056 | 4/1994 | Constable | 358/350 |

FOREIGN PATENT DOCUMENTS

| | | | |
|---|---|---|---|
| 0089380 | 6/1982 | Japan | 358/244 |
| 0144985 | 7/1986 | Japan | H04N 5/84 |
| 0136033 | 6/1988 | Japan | 358/244 |
| 2231247 | 11/1990 | United Kingdom | |

*Primary Examiner*—James J. Groody
*Assistant Examiner*—Chris Grant
*Attorney, Agent, or Firm*—Ronald M. Reichman

[57] ABSTRACT

A system is provided that causes the CRT of a CRT printer to produce images on the screen of the CRT that have the same illumination for the same CRT input signal, irregardless of the temperature variation, drift and aging of the components of the CRT video amplifier and drive circuit. The system also provides enhanced means of horizontal and vertical blanking combined with shutter control of the CRT.

12 Claims, 2 Drawing Sheets

VIDEO AMPLIFIER STABILIZATION FOR CRT PRINTING

FIELD OF THE INVENTION

The present invention relates to a photographic printer in which a CRT is used as a imaging source for producing prints on photosensitive media.

BACKGROUND OF THE INVENTION

A cathode ray tube (CRT) converts information contained in an input signal to electron beam energy and converts that energy into light energy to provide a visual information output on a phosphorous screen. The amount of beam modulation of the CRT and thus, the amount of light output of the CRT is a function of the voltage difference between the cathode and the first grid of the CRT (the grid closest to the cathode). If the voltage of the first grid of the CRT is held constant, then the cathode may be modulated with the voltage that represents the video information i.e. the input signal. In the event the voltage on the cathode is held constant then the voltage on the first grid may be modulated with the voltage that, represents the video information i.e. the CRT input signal.

A CRT video amplifier drive circuit provides blanking of the CRT input signal during the horizontal and vertical retrace periods i.e. the time the electron beam returns to its starting point for scanning a horizontal line and the time the electron beam returns to its starting point for scanning the image vertically. The aforementioned circuit also amplifies and processes the video information and applies it to the cathode or the first grid.

Photographic printers have been utilized that use a CRT as an imaging source for producing a print on a photosensitive media. A monochromatic or color CRT may be used as a imaging source and a monochromatic or color photosensitive media such as photosensitive paper or film may be used to record the CRT produced image. Typically a monochromatic image is displayed on the phosphorous screen of a CRT by modulating the electron beam of the CRT with dark to light gradations of the image and simultaneously deflecting the CRT electron beam to achieve the position of the pixels on the CRT screen. The image on the screen of the CRT may be transferred to the photographic media by any known means i.e. contact printing (the photographic media is placed directly on the CRT screen), projected by one or more lenses and/or one or more mirrors.

A monochromatic CRT may be used to display a color picture on a photographic media. When a monochromatic display is used, three sequential exposures through red, green and blue filters will individually expose the photographic media to the red, green and blue components of the image displayed on the screen of the CRT.

A color CRT may also be used to display a color picture on a photographic media. If a color CRT was used, the color CRT would expose in one sequence the red, green and blue portions of the image on the screen of the CRT simultaneously onto the photographic media.

PROBLEMS TO BE SOLVED BY THE INVENTION

One of the problems encountered by the prior art was that for a given CRT input signal the CRT would not always produce an image on the screen of the CRT having the same illumination. Thus, the photographic media would not be able to produce prints of uniform density. The reason for the above is that the output of the video amplifier drive circuit of the CRT, which drives the first grid or cathode of the CRT, and hence controls the illumination of the image on the screen of the CRT, is a function of the temperature and aging of the components of the video amplifier drive circuit. Hence, as the CRT printer is used the components of the video amplifier drive circuit change in temperature and the image appearing on the screen of the CRT correspondingly becomes lighter or darker.

The screen of the CRT may also become lighter or darker as the components of the video amplifier drive circuit age over time. In the prior art, the biasing or clamping of the video amplifier stages was done by horizontal and/or vertical rate pulses. These pulses would cause sampling or clamping capacitors to be charged or discharged and this would establish the DC operating point of the amplifier stages. Hence, when these pulses are absent, the video amplifier is unbiased and when the pulses are then applied to the circuit, a period of time elapses before the pulses establish the stable DC operating point of the amplifier stages. During the initial stabilization time, the image will be lighter or darker until the biasing or clamping of the amplifier settles to its final value.

This is a disadvantage if it is desired to print on a photosensitive media immediately after the horizontal and/or vertical pulses are applied to the video amplifier.

The present invention overcomes this disadvantage by providing a shutter control that simultaneously blanks the CRT inbetween producing prints and also maintains an established biasing of the video amplifier in the absence of horizontal and/or vertical pulses. In the prior art, the CRT video amplifier may have inputs for several pulse signals in addition to the video input signal. There may be a blanking signal to turn off the electron beam during the horizontal and vertical retrace period. There also may be a blank clamp signal to establish DC levels during the retrace period. There also may be sync signals used to co-ordinate or generate the above two signals. All of the aforementioned additional input signals may occur at a horizontal and/or vertical rate. A disadvantage of the above is that many circuits were utilized to control the video output of the CRT electron beam.

SUMMARY OF THE INVENTION

This invention overcomes the disadvantages of the prior art by providing a system that causes the CRT of a CRT printer to produce images on the screen of the CRT that have the same illumination for the same CRT input signal, irregardless of the temperature variation, drift and aging of the components of the CRT video amplifier drive circuit. This invention also provides horizontal and vertical blanking of the CRT and shutter control of the CRT. The above is provided by a single control system.

ADVANTAGEOUS EFFECTS OF THE INVENTION

The above CRT system causes the CRT to produce images on the screen of the CRT that have the same illumination for the same CRT input signal. Thus, the photographic media that is exposed to the screen of the CRT would receive the same amount of light for a given CRT input signal and prints having the same density may be produced for the same CRT input signal. Hence, prints of uniform quality may be produced.

This invention also reduces and simplifies the number of circuits that are required to control the electron beam of the CRT.

This invention also provides a shutter control signal which may be combined with the CRT blanking signal to disable the CRT electron beam inbetween exposures of the photographic media.

Thus, a single switch control line can provide both horizontal and vertical blanking and shutter control.

The foregoing is accomplished by providing video amplifier stabilization system for controlling the illumination of an image that appears on the screen of a CRT of a CRT printing device and is provided from a video source producing a video input signal representing the image, wherein the video source is D.C. coupled into the stabilization system and a blanking input is produced by the video source coincident with horizontal and vertical retrace periods to blank the image during the horizontal and vertical retrace periods, said system characterized by: a switch capable of selecting the video input signal when the video source is in an unblanked mode and capable of selecting a DC reference voltage when the video source is in a blanked mode; an amplifier coupled to said switch and the cathode of the CRT to amplify the video input signal; means for storing a voltage; means coupled to said switch and adapted to receive the blanking input for extinguishing the image that appears on the screen of the CRT to act as a shutter; and switching means coupled to the output of said amplifier, said storing means and said extinguishing means, for closing responsive to the presence of the blanking signal to cause said switching means to close and a voltage to be stored in said storing means and for opening responsive to the absence of the blanking signal to permit the voltage stored in said storing means to be transmitted to said amplifier; whereby, the image appearing on the screen of the CRT will be controlled by said extinguishing means and have the same illumination for the same video input signal enabling prints of uniform picture density to be produced.

DESCRIPTION OF THE PREFERRED EMBODIMENT

Figure 1:
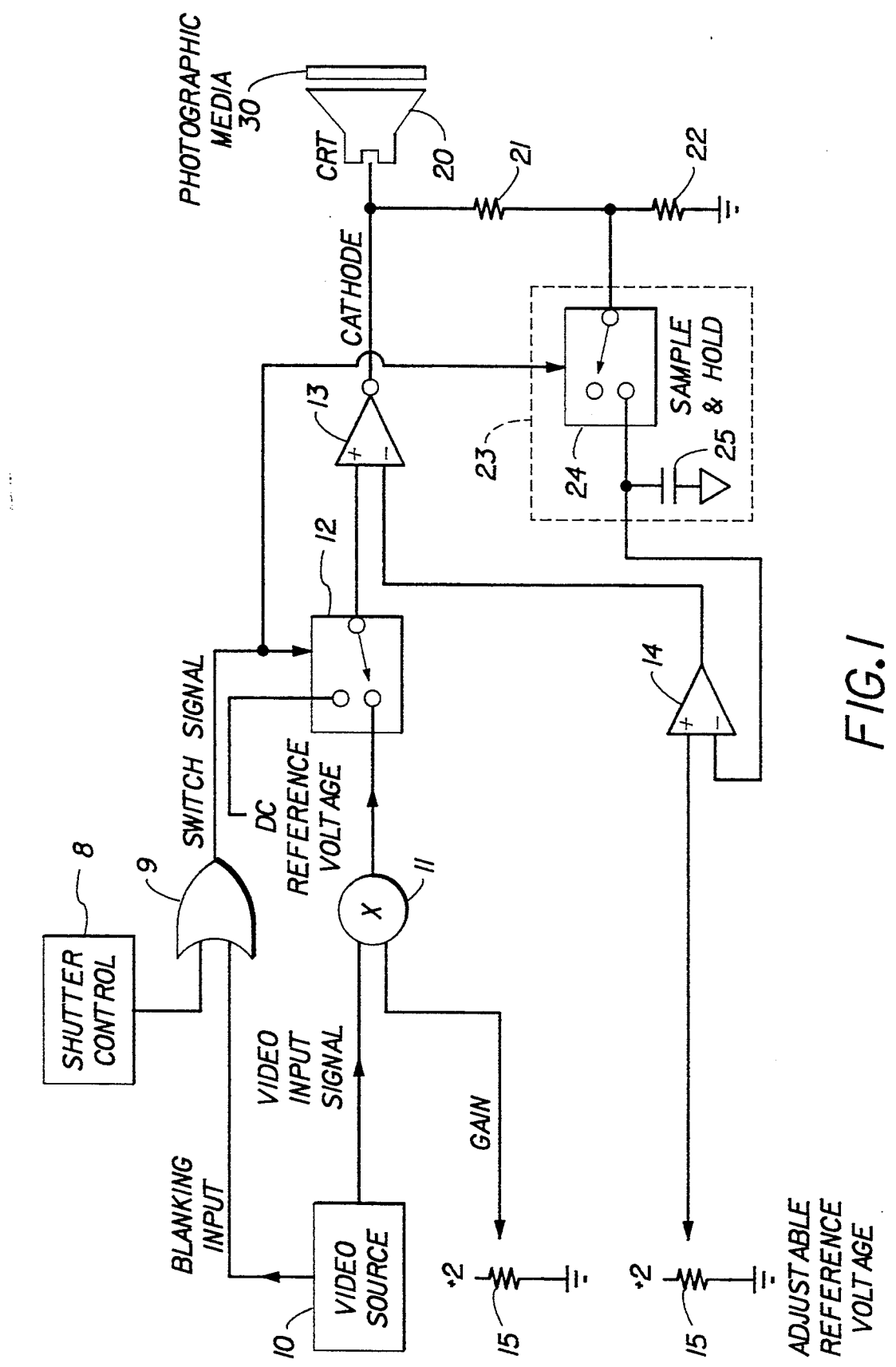
FIG. 1 is a drawing of a video amplifier stabilization system that is connected to the cathode of a CRT in a CRT printer.

Referring now to the drawings in detail, and more particularly to FIG. 1, the reference character 10 represents a video source. Video source 10 may be a frame store, a television camera or a scanner. The video input signal produced by source 10 i.e. the signal that represents the image that is going to be displayed on the screen of CRT 20 is coupled to one of the two inputs of multiplier 11. When a portion of the video input signal has a certain voltage, for instance 2 volts, a white image will be produced on the screen of CRT 20 and when the video input signal has a voltage of approximately 0 volts a black portion of the image will be produced on the screen of CRT 20. The other input to multiplier 11 is a DC voltage that represents the desired system gain. The aforementioned DC voltage may be controlled by potentiometer 16.

The blanking input produced by video source 10 is coupled to one of the inputs of OR gate 9 and the second input to gate 9 is coupled to the output of shutter control 8. Shutter control 8 is used to extinguish the image appearing on the screen of CRT 20 inbetween print exposures.

Multiplier 11 multiplies its two input signals and transmits the multiplied signal to one of the two inputs of selector switch 12. The second input to selector switch 12 is a DC reference voltage. Switch 12 is controlled by the output of OR gate 9, (the switch signal). The switch signal causes switch 12 to select the output of multiplier 11 or the DC reference voltage. During the blanking period of the blanking signal, or when the shutter control extinguishes CRT 20, switch 12 selects the reference voltage. This sets both the black level voltage and the blanking voltage. During the unblanked or active video portion of the blanking signal, switch 12 selects the output of multiplier 11 and applies the aforementioned selected signal to the positive input of amplifier 13. When shutter control 8 is extinguishing the image appearing on the screen of CRT 20, switch 12 is connected to the DC reference voltage. The negative input to amplifier 13 is the output of amplifier 14. The positive input to amplifier 14 is a adjustable reference voltage that selects the desired offset voltage of the video signal applied to the cathode of CRT 20, hereinafter referred to as the video image signal. This DC voltage is selected by potentiometer 15. This selected DC voltage sets both the black voltage and the blanking voltage of the video image signal, maintaining a fixed voltage differential between the black voltage and the blanking voltage. The voltage differential between the black voltage and the blanking voltage of the video image signal is set by the adjustable reference voltage. The negative input to amplifier 14 is the output of sample and hold circuit 23, hereinafter described. The output of amplifier 13 is the video image signal that drives the cathode of CRT 20 and causes an image to appear on the screen of CRT 20. Thereupon, phototographic media 30 may be exposed to the image appearing on the screen of CRT 20.

The output of amplifier 13 is also connected to one of the ends of resistor 21. The other end of resistor 21 is connected to one of the ends of resistor 22. The other end of resistor 22 is connected to ground. Resistors 21 and 22 function as a resistor voltage divider. Hence, the video image signal will appear across resistor 22 with reduced video amplitude. The reduced video amplitude signal is applied to sample and hold circuit 23. Sample and hold circuit 23 includes a switch 24 and a capacitor 25 which is connected to ground. When the switch signal to switch 24 is in the blank or inactive video state, switch 24 is closed and a sample of the video image signal, representing the blanking level is stored on capacitor 20. When the switch signal to switch 24 is in the unblanked or active video state, switch 24 is open and capacitor 25 holds the blanking voltage during the active video period. The voltage held on capacitor 25 is applied to the negative terminal of amplifier 14.

Active video is displayed on the screen of CRT 20 when the system is in the unblanked (active video) state. The input signal that carries the video information is fed to multiplier 11. The magnitude of the white and grey portions of the aforementioned signal is adjusted by the DC voltage selected by potentiometer 16. This DC voltage is multiplied by the video input signal as a means of controlling the system gain. The video input signal is supplied such that black is at 0 volts or close to 0 volts. The result of having black at 0 volts is that multiplier 11 does not change the output voltage representing black as potentiometer 15 is adjusted.

The input voltage representing white is a positive voltage, for instance 2 volts. The video signal from the output of multiplier 11 goes through switch 12 to amplifier 13 and from amplifier 13 to the cathode of CRT 20.

Amplifier 13 is a large gain amplifier and its output voltage may drift with temperature. When the system is switched to the blanked state, a feedback loop is closed around amplifier 13 which corrects its voltage drift. This, prevents a corresponding change in the illumination of the image on the screen of CRT 20. In the blanked state, switch 12 connects D.C. reference voltage, to amplifier 13. The output of amplifier 13 is the amplified voltage received from switch 12 plus the drift voltage. Thus, the DC reference voltage becomes the video image signal blanking voltage after passing through amplifier 13. A sample of the output of amplifier 13 is applied to sample and hold circuit 23 via resistors 21 and 22. The aforementioned voltage sample is held on capacitor 25 and applied to the input of amplifier 14 for both the blanked and unblanked periods. The sample and hold error voltage is subtracted from the desired offset voltage, selected by potentiometer 15, at the input to amplifier 14. The foregoing corrects the drift of amplifier 14 and stabilizes amplifiers 13 and 14 when shutter control 8 is inbetween print exposures when horizontal and/or vertical pulses are absent.

Figure 2:
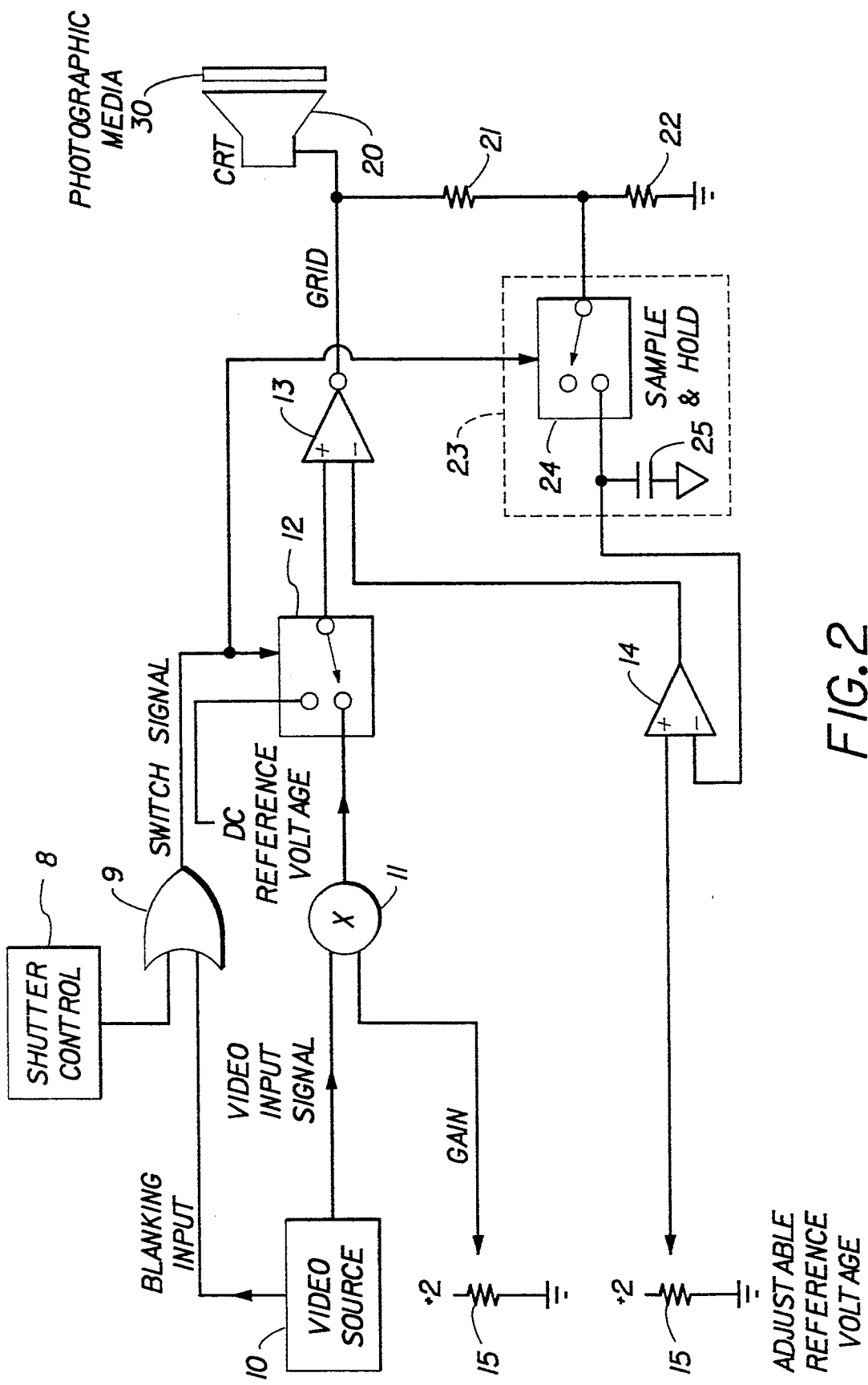
FIG. 2 is a drawing of a video amplifier stabilization system that is connected to the grid of a CRT in a CRT printer.

FIG. 2 is a drawing of a video amplifier stabilization system that is connected to the grid of a CRT in a CRT printer. Video source 10 may be a frame store, a television camera or a scanner. The video input signal produced by source 10 i.e. the signal that represents the image that is going to be displayed on the screen of CRT 20 is coupled to one of the two inputs of multiplier 11. When a portion of the video input signal has a certain voltage, for instance 2 volts, a white image will be produced on the screen of CRT 20 and when the video input signal has a voltage of approximately 0 volts a black portion of the image will be produced on the screen of CRT 20. The other input to multiplier 11 is a DC voltage that represents the desired system gain. The aforementioned DC voltage may be controlled by potentiometer 16.

The blanking input produced by video source 10 is coupled to one of the inputs of OR gate 9 and the second input to gate 9 is coupled to the output of shutter control 8. Shutter control 8 is used to extinguish the image appearing on the screen of CRT 20 inbetween print exposures.

Multiplier 11 multiplies its two input signals and transmits the multiplied signal to one of the two inputs of selector switch 12. The second input to selector switch 12 is a DC reference voltage. Switch 12 is controlled by the output of OR gate 9, (the switch signal). The switch signal causes switch 12 to select the output of multiplier 11 or the DC reference voltage. During the blanking period of the blanking signal or when shutter control 8 extinguishes CRT 20, switch 12 selects the DC reference voltage and during the unblanked portion or active portion of the blanking signal, switch 12 selects the output of multiplier 11 and applies the aforementioned selected signal to the positive input of amplifier 13. When shutter control 8 is extinguishing the image appearing on the screen of CRT 20, switch 12 is connected to the DC reference voltage. The negative input to amplifier 13 is the output of amplifier 14. The positive input to amplifier 14 is a adjustable voltage that selects the desired offset voltage of the video image signal. This DC voltage is selected by potentiometer 15. This selected DC voltage sets both the black voltage and the blanking voltage of the video image signals, maintaining a fixed voltage differential between the black voltage and the blanking voltage. The voltage differential between the black voltage and the blanking voltage of the video image signal is set by the adjustable reference voltage. The negative input to amplifier 14 is the output of sample and hold circuit 23, hereinafter described. The output of amplifier 13 is the video image signal that drives the grid of CRT 20 and causes an image to appear on the screen of CRT 20. Thereupon, phototographic media 30 may be exposed to the image appearing on the screen of CRT 20.

The output of amplifier 13 is also connected to one of the ends of resistor 21. The other end of resistor 21 is connected to one of the ends of resistor 22. The other end of resistor 22 is connected to ground. Resistors 21 and 22 function as a resistor voltage divider. Hence, the video image signal will appear across resistor 22 with reduced video amplitude. The reduced video amplitude signal is applied to sample and hold circuit 23. Sample and hold circuit 23 includes a switch 24 and a capacitor 25 which is connected to ground. When the switch signal to switch 24 is in the blank or inactive video state, switch 24 is closed and a sample of the video image signal, now applied to the grid of CRT 20, representing the blanking level is stored on capacitor 25. When the switch signal to switch 24 is in the unblanked or active video state, switch 24 is open and capacitor 25 holds the blanking voltage during the active video period. The voltage held on capacitor 25 is applied to the negative terminal of amplifier 14.

The above specification describes a new and improved video amplifier stabilization device for a CRT printer. It is realized that the above description may indicate to those skilled in the art additional ways in which the principles of this invention may be used without departing from the spirit. It is, therefore, intended that this invention be limited only by the scope of the appended claims.

What is claimed is:

1. A video amplifier stabilization system for controlling the illumination of an image that appears on the screen of a CRT of a CRT printing device and is provided from a video source producing a video input signal representing the image, wherein the video source is DC coupled into the stabilization system and a blanking input is also produced by the video source coincident with horizontal and vertical retrace periods to blank the image during the horizontal and vertical retrace periods, said system characterized by:

first switching means for selecting the video input signal when the video source is in an unblanked mode and capable of selecting a DC reference voltage when the video source is in a blanked mode;

an amplifier whose first input is coupled to said first switching means and the output of said amplifier is connected to the cathode of the CRT to display the image represented by the video input signal;

means for storing a DC voltage;

means coupled to said first switching means and adapted to receive the blanking input for extinguishing the image that appears on the screen of the CRT to act as a shutter; wherein said extinguishing means combines: a shutter control for extinguishing the CRT in-between exposures; and gating means whose first input is coupled to said shutter control, and whose second input is coupled to the blanking input and whose output is coupled to said first switching means and a second switching means for extinguishing images appearing on the screen of the CRT in-between print exposures and during horizontal and vertical blanking and said second switching means is coupled to the output of said amplifier, said storing means and said extinguishing means, for closing in response to the presence of the blanking signal to cause said second switching means to close and a voltage to be stored in said storing means and for opening in response to the absence of the blanking signal to permit the voltage stored in said storing means to be transmitted to a second input of said amplifier, for stabilizing or correcting said amplifier for thermal drifts; whereby, the image appearing on the screen of the CRT will be controlled by said extinguishing means and have the same illumination for the same video input signal enabling prints of uniform density to be produced.

2. The system claimed in claim 1, further including a second amplifier whose first input is coupled to both said storing means and to said second switching means and whose second input is coupled to a second adjustable reference voltage level so that said second amplifier may transmit an offset level voltage to said second input of said first amplifier to control a black level of the image appearing on the screen of the CRT.

3. The system claimed in claim 2, further including a potentiometer that is coupled to said second amplifier so that said second adjustable reference voltage level may be transmitted by said second amplifier to said first amplifier.

4. The system claimed in claim 1, further including a multiplier that is interposed between the video source and said first switching means to regulate gain of the video input signal that is applied to said first switching means.

5. The system claimed in claim 4, further including a potentiometer that is connected to said multiplier to adjust gain of the video input signal that is applied to said first switching means.

6. The system claimed in claim 1, wherein said means for storing a DC voltage is a capacitor.

7. A video amplifier stabilization system for controlling the illumination of an image that appears on the screen of a CRT of a CRT printing device and is provided from a video source producing a video input signal representing the image, wherein the video source is DC coupled into the stabilization system and a blanking input is also produced by the video source coincident with horizontal and vertical retrace periods to blank the image during the horizontal and vertical retrace periods, said system characterized by:

first switching means for selecting the video input signal when the video source is in an unblanked mode and capable of selecting a DC reference voltage when the video source is in a blanked mode;

an amplifier whose first input is coupled to said first switching means and the output of said amplifier is connected to the grid of the CRT to display the image represented by the video input signal;

means for storing a DC voltage;

means coupled to said first switching means and adapted to receive the blanking input for extinguishing the image that appears on the screen of the CRT to act as a shutter; wherein said extinguishing means combines: a shutter control for extinguishing the CRT in-between exposures; and gating means whose first input is coupled to said shutter control, and whose second input is coupled to the blanking input and whose output is coupled to said first switching means and a second switching means for extinguishing images appearing on the screen of the CRT in-between print exposures and during horizontal and vertical blanking and said second switching means is coupled to the output of said amplifier, said storing means and said extinguishing means, for closing in response to the presence of the blanking signal to cause said second switching means to close and a voltage to be stored in said storing means and for opening in response to the absence of the blanking signal to permit the voltage stored in said storing means to be transmitted to a second input of said amplifier, for stabilizing or correcting said amplifier for thermal drifts; whereby, the image appearing on the screen of the CRT will be controlled by said extinguishing means and have the same illumination for the same video input signal enabling prints of uniform density to be produced.

8. The system claimed in claim 7, further including a second amplifier whose first input is coupled both to said storing means and to said second switching means and whose second input is coupled to a second adjustable reference voltage level so that said second amplifier may transmit an offset level voltage to said second input of said first amplifier to control the black level of the image appearing on the screen of the CRT.

9. The system claimed in claim 8, further including a potentiometer that is coupled to said second amplifier so that said second adjustable reference voltage level may be transmitted by said second amplifier to said first amplifier.

10. The system claimed in claim 7, further including a multiplier that is interposed between the video source and said first switching means to regulate gain of the video input signal that is applied to said first switching means.

11. The system claimed in claim 10, further including a potentiometer that is connected to said multiplier to adjust gain of the video input signal that is applied to said first switching means.

12. The system claimed in claim 7, wherein said means for storing a DC voltage is a capacitor.

* * * * *